(12) United States Patent
Giger

(10) Patent No.: US 6,463,393 B1
(45) Date of Patent: Oct. 8, 2002

(54) DEVICE FOR CALIBRATING DISTANCE-MEASURING APPARATUS

(75) Inventor: Kurt Giger, Ruethi (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 09/284,473

(22) PCT Filed: Oct. 17, 1997

(86) PCT No.: PCT/EP97/05735

§ 371 (c)(1),
(2), (4) Date: Jun. 18, 1999

(87) PCT Pub. No.: WO98/18019

PCT Pub. Date: Apr. 30, 1998

(51) Int. Cl.$^7$ ................................................ G01C 25/00
(52) U.S. Cl. ........................ 702/97; 356/5.13; 356/623
(58) Field of Search .................. 702/97, 176; 235/462; 356/5, 5.1, 5.11, 5.12, 5.13, 4.01, 623

(56) References Cited

U.S. PATENT DOCUMENTS

| | | | |
|---|---|---|---|
| 3,759,616 A | * | 9/1973 | Hildebrand ................ 356/4.01 |
| 3,778,159 A | * | 12/1973 | Hines et al. ................ 356/5.11 |
| 3,900,260 A | * | 8/1975 | Wendt ........................ 356/5.12 |
| 4,274,736 A | * | 6/1981 | Balmer ...................... 356/5.13 |
| 5,125,736 A | | 6/1992 | Vaninetti et al. .............. 356/5 |
| 5,180,922 A | * | 1/1993 | Hug ....................... 250/559.38 |
| 5,430,537 A | * | 7/1995 | Liessner et al. ............. 356/5.1 |
| 5,737,085 A | * | 4/1998 | Zollars et al. .............. 356/623 |
| 5,815,251 A | | 9/1998 | Ehbets et al. .............. 356/5.01 |
| 5,874,719 A | * | 2/1999 | Hippenmeyer et al. 235/462.01 |

FOREIGN PATENT DOCUMENTS

| | | |
|---|---|---|
| CH | 589856 | 7/1977 |
| CH | 1543636 | 4/1979 |
| DE | 2229339 | 10/1980 |
| DE | 3710041 | 10/1988 |
| DE | 4002356 | 2/1991 |
| DE | 4316348 | 11/1994 |
| EP | 336027 | 4/1988 |

* cited by examiner

Primary Examiner—Marc S. Hoff
Assistant Examiner—Mohamed Charioui
(74) Attorney, Agent, or Firm—Foley & Lardner

(57) ABSTRACT

A transmitter emits high-frequency modulated optical radiation which is reflected by an object and is received by a measurement receiver. Part of the transmitter radiation is decoupled as reference radiation and guided via a calibration path to a reference receiver whose electrical signals are fed to a frequency mixer. The frequency mixer and avalanche photodiodes acting as measurement receivers of the measuring radiation are interconnected directly via an electrical connection line upon which a mixer frequency acts. As a result thereof, optoelectronic calibration which completely compensates for the temperature-dependent phase shifts of the avalanche photodiodes is possible. Additionally, the phase shifts generated in the reference and receiver signals by the temperature drifts of the transmitter compensate one another. The overall accuracy of the distance measurement can be increased, particularly for short measuring times and immediately after the apparatus has been switched on. Furthermore, in comparison with a successive mechanical calibration process, the measuring times are halved and advantages in terms of weight, cost, and reliability are afforded since a mechanical change-over device is dispensed with.

21 Claims, 3 Drawing Sheets

DEVICE FOR CALIBRATING DISTANCE-MEASURING APPARATUS

CROSS-REFERENCE TO RELATED APPLICATION

This application is the national stage application of PCT/EP97/05735, filed Oct. 17, 1997, which is entitled to priority of German Application No. 196 43 287.1, filed Oct. 21, 1996.

BACKGROUND OF THE INVENTION

1. Field of the Invention

The invention relates to a device for calibrating distance-measuring apparatuses.

2. Description of the Related Art

The distance-measuring apparatuses are commercially available as hand-held measuring apparatuses. Their distance measuring range is a few multiples of 10 m and they are used mainly in building surveying, for example for the 3-dimensional measurement of rooms. The transmitter emits an intensity-modulated beam. In general, wavelengths in the visible range are used, facilitating the aiming at the measuring points. The beam is reflected or scattered by the object to be measured and is picked up by the receiver. The distance from the object to be measured is obtained on the basis of the phase position of the modulated beam relative to the transmitter.

It is known that the accuracy of measurement of these distance-measuring apparatuses is determined to a great extent by environmental influences and apparatus-related influences. For example, varying ambient temperatures, the large dynamic range of the reflection of the illuminated object to be measured, but in particular a component-related temperature drift of the electronics, affect the distance measurement. In order to reduce these influences, a known reference distance in the apparatus itself is used for calibration.

DE 22 29 339 B2 discloses an electro-optical distance-measuring apparatus in which the emitted light beam is modulated in a switchable manner with two different measuring frequencies for rough and precise measurement. In the receiver, the rough measurement frequency is fed directly to the intermediate frequency amplifiers (IF) without mixing. In addition, an auxiliary oscillator whose frequency is chosen so that it corresponds to the difference between the two measuring frequencies is used in the receiver. Thus, the rough measurement frequency and the low frequency which results during the precise measurement after frequency mixing are equal. Consequently, an otherwise usual second auxiliary oscillator is dispensed with, leading to a reduction in the expensive components. When carrying out a distance measurement, the measuring beam is passed alternately over a measuring distance and a calibration distance with the aid of a mechanical switching shutter.

DE 37 10 041 C2 discloses a device for non-contact optoelectronic distance measurement with the aid of fibre-optic bundles. The light at the end of one fibre bundle strikes a reference mirror as reference light while the light of a second fibre bundle is directed as measuring light via a lens to a reflector. The evaluation of the reflected measuring light and reference light is carried out by means of mixing stages which are connected to a common auxiliary oscillator. The mixing stages deliver intermediate frequency signals to the inputs of a phase measurement means.

DE 4 316 348 A1 describes a device for distance measurement, in which an internal reference distance is generated with the aid of a switchable beam deflection means. The beam deflection means is swivelled about an axis under motor power into the measuring light beam path, where it now deflects the measuring light as reference light for calibration to the receiver. As a result of the mechanical switching of the beam deflection means, reference light and measuring light alternately reach the receiver. This switching can be effected several times during the distance measuring process.

During the measuring time, in which the measuring and reference beam are detected in succession, the drift conditions of the electronic components change. All electronic components and lines give rise to signal delays in the signal path of an optical distance-measuring device. These delays are not only of a static nature but also change as a function of time, in particular on the basis of the temperature of the electronic components. In addition to temperature changes of the environment, the self-heating of the electronics, in this case in particular the transmitter electronics, is mainly responsible for the drift of the signals. A phase meter registers these signal delays as phase shifts, which occur in addition to the distance-dependent phase shift actually to be determined.

This effect is particularly pronounced directly after the distance-measuring apparatus has been switched on, since in this state the temperature changes of the electronic components due to their self-heating are the greatest. This results in particularly large signal delays which cause a phase shift of the signals and hence errors in the distance measurement. However, it is precisely battery-operated hand-held measuring apparatuses which are required to measure with the specified accuracy immediately after the apparatus has been switched on. The thermal drift of the electronics is partly compensated by repeated mechanical switching between measuring and reference beam during a measurement. A high accuracy of measurement with short measuring times immediately after switching on the apparatus is however not achieved.

In addition, many apparatuses are set up in such a way that at least the high-frequency electronics of the transmitter automatically switches off after a short waiting time at the end of a distance measurement, since said electronics consume a particularly large amount of electrical energy. As a result of the automatic switching off, the battery of the hand-held measuring apparatus is saved. If a further measurement is required, the apparatus then switches on automatically, the associated thermal drift problems, as described above, being repeated.

The avalanche photodiode usually used as a measuring receiver also makes a further contribution to the accuracy of measurement. Although said photodiode has the advantage of high amplification, it is necessary to accept a high operating voltage dependent on the temperature of the diode. Since, however, the operating voltage has to be adjusted as a function of the diode temperature, the phase position of the signal received and hence the measured value for the distance also inevitably change.

Finally, repeated mechanical switching during the measurement process results in high mechanical stresses and hence considerable wear of the moving parts. Correspondingly complicated designs on the other hand in turn mean high manufacturing costs and generally a large weight and volume.

SUMMARY OF THE INVENTION

It is the object of the invention to provide a device for calibration in optoelectronic distance measurement, with the aid of which device high accuracies of distance measurement are achieved in short measuring times and in particular immediately after switching on the apparatus, the reliability of the apparatus is increased and a simple and compact design with low manufacturing costs is permitted.

According to the invention, a part of the high-frequency modulated transmitter beam is always decoupled from the emitter beam of the distance-measuring apparatus and is fed to a reference receiver, e.g. a PIN diode, over an internal reference distance serving as a calibration distance. Said diode is connected to a frequency mixer. This frequency mixer in turn is connected directly to the avalanche photodiode used as a receiver for the measured beam. A high-frequency electrical signal which is to be referred to as the mixer frequency is input into this connection. On the one hand, this mixer frequency is thus mixed by means of the frequency mixer with the high-frequency modulation signal of the reference beam received from the reference receiver, with the result that a low-frequency calibration signal is generated. On the other hand, the mixer frequency is mixed with the high-frequency modulation signal of the measured beam received from the avalanche photodiode, with the result that a low-frequency measuring signal is generated. The avalanche photodiode is a so-called direct mixer. The low-frequency calibration signal and the low-frequency measuring signal are fed to the phase measurement means. Two separate phase meters can be used for simultaneous phase measurement. However, the phase measurement is also possible with only one phase meter, by sequential measurement.

What is decisive is that, by the electrical connection between the frequency mixer coordinated with the reference receiver and the avalanche photodiode, the signal delays which are due to the varying operating voltage of the avalanche photodiode act equally on the low-frequency calibration and measuring signal. Consequently, exactly the same phase shift is produced in the low-frequency calibration and measuring signal and therefore no longer occurs in the phase measurement with subtraction of the measurement and the calibration phase.

Specifically, avalanche photodiodes have about 100 times higher amplification than other photodiodes and hence a correspondingly high sensitivity. For this they require a very much higher and temperature dependent operating voltage in operation. Consequently, avalanche photodiodes must be operated with variable bias voltage dependent on the temperature. As a result of this, the capacitance of an avalanche photodiode changes with the varying bias voltage so that undesired phase shifts are caused. However, these phase shifts are equal both for the low-frequency measuring signal delivered by the avalanche photodiode and for the low-frequency calibration signal, owing to the electrical connection between frequency mixer and avalanche photodiode. Thus, the bias voltage of the avalanche photodiode, which varies as a function of temperature, is eliminated as a source of error for the distance value determined from the phase measurement.

Likewise, the temperature drifts of the transmitter, in particular of the transmitter diode and of the associated driver electronics, are also compensated by the calibration process according to the invention shortly after the apparatus has been switched on. The measuring beam and reference beam are detected simultaneously by constantly supplying a part of the transmitter beam to the reference receiver. This supply can be effected, for example, by decoupling the reference beam from the emitter beam by means of a partly transparent mirror. The decoupled beam passes over a reference distance to the reference detector. A sufficient intensity of the measuring beam leading to the object to be measured can also always be ensured since, with the aid of the present efficient semiconductor lasers as transmitters, the intensity of their emitted beam can be correspondingly regulated.

Because reference and measuring beam are received not in succession but simultaneously and their mutual phase position is measured, a drift of the transmitter in calculating the difference between the phases is eliminated by calibration.

In general, the accuracy of the distance measurement is increased by this optoelectronic calibration, in particular with the requirements that only short measuring times are permitted and that the increased accuracy of measurement is achieved immediately after the apparatus has been switched on. In addition, the measuring times are reduced to about half that of the conventional successive measuring methods, since switching operations are dispensed with. The reliability of the apparatus, too, is improved by the invention since no mechanically movable components are necessary. Moreover, the omission of the mechanical switching device is advantageous for a handheld measuring apparatus, owing to the lower weight and volume. The associated lower manufacturing costs are also advantageous. Finally, the short measuring times permit a substantially larger number of measurements with a given battery charge.

BRIEF DESCRIPTION OF THE DRAWINGS

Embodiments of the invention are illustrated in more detail below with reference to the drawing.

DESCRIPTION OF SPECIFIC EMBODIMENTS

Figure 1:
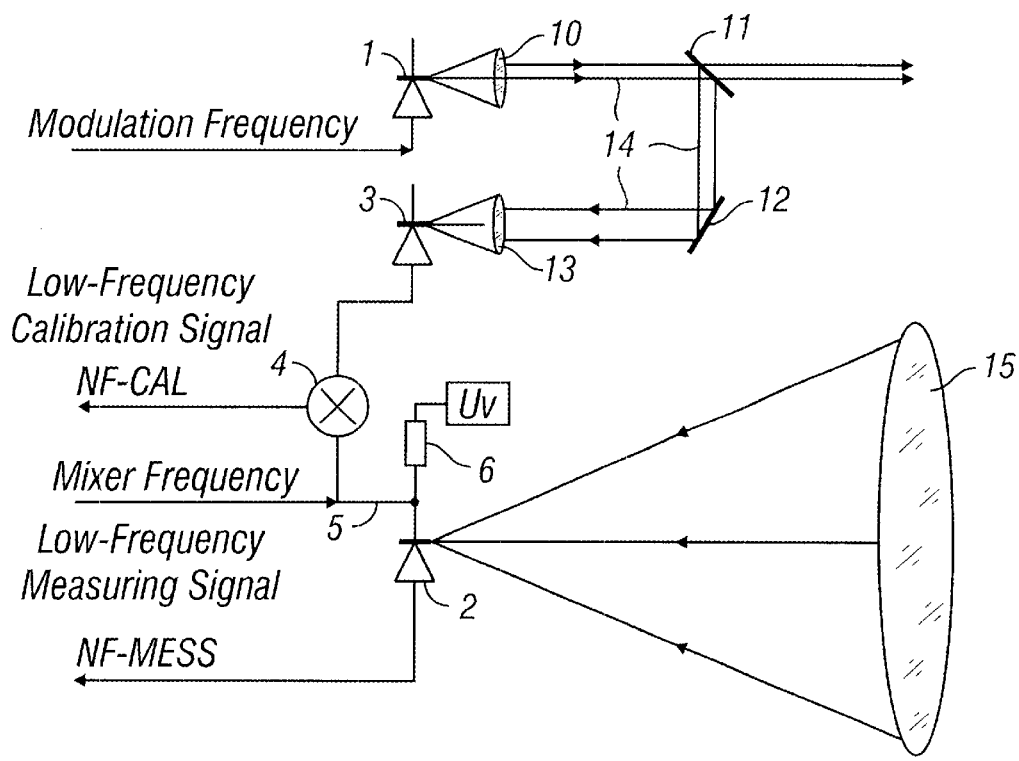
FIG. 1 shows a schematic diagram of the subject of the invention.

FIG. 1 schematically shows a distance-measuring apparatus according to the invention. The optical beam emitted by the transmitter 1 and collimated by an optical collimation means 10 is divided by a beam divider 11 into a measuring beam and into a reference beam. The measuring beam reaches an object which is to be measured and whose distance is to be determined. The beam reflected or scattered by the object to be measured is guided in the usual way via a receiving lens system 15 to a measuring receiver 2.

After covering a reference distance 14 which leads via the beam divider 11, a deflection mirror 12 and a lens system 13, the reference beam is received by a reference receiver 3. The reference distance 14 is the optical calibration distance of the distance-measuring apparatus. Depending on the space available in the apparatus, the reference distance 14 can of course be otherwise designed and, for example, the reference receiver 3 can be positioned directly after the beam divider 11. The reference receiver 3 used is preferably a PIN diode. The electrical signals of the reference receiver 3 are transmitted on to a frequency mixer 4. If an avalanche photodiode is used instead of the PIN diode as reference receiver 3 and said photodiode is operated as a direct mixer, it simultaneously replaces the frequency mixer 4.

A high modulation frequency is superposed on the transmitter 1 and is used for intensity-modulation of the emitted beam. The measuring receiver 2 and the frequency mixer 4 are supplied with a similarly high frequency as mixer frequency simultaneously via an electrical connecting line 5. The measuring receiver 2 used is an avalanche photodiode which is operated as a direct mixer and which is at a variable bias voltage $U_v$, across a series resistor 6.

The mixing of the measuring signals received by the measuring receiver 2 with the signals of the mixer frequency leads to a low-frequency signal NF-MESS. The high-frequency signal components generated during the mixing—or, in mathematical terms, a multiplication—of the signals are filtered out by means of conventional filters. At the same time, the signals of the mixer frequency are also mixed with the reference signals received from the reference receiver 3 in the frequency mixer 4 and lead to a low-frequency signal NF-CAL. The mutual phase position of the NF-MESS and NF-CAL is measured simultaneously with the aid of one phase meter each. The phase difference between these low-frequency signals is calculated and the distance to the object to be measured is determined from this.

According to the invention, the measuring receiver 2 and mixer 4 are electrically connected to one another via the connecting line 5, to which the high mixer frequency is applied. This has the decisive advantage that the undesired phase shifts which are generated by the measuring receiver 2 and are unavoidably formed owing to the temperature-dependent follow-up bias voltage $U_v$, influence the signals NF-MESS and NF-CAL simultaneously and to the same extent. Thus, in the calculation of the difference between these two signals, the undesired phase shifts are completely compensated by the measuring receiver 2. Consequently, a very exact calibration of the distance measurement is finally permitted with the aid of the connecting line 5 according to the circuit arrangement in FIG. 1.

Moreover, the drifts of the transmitter 1 and of its driver electronics are also compensated owing to the simultaneous reception of the reference and measuring beam during the ongoing distance measurement. Thus, the phase difference between reference and measuring beam is independent of the drift of the transmitter 1. The phase difference contains essentially only the distance information.

With this optoelectronic calibration, the accuracy of distance measurement increases considerably with short measuring times and shortly after switching on the apparatus, in comparison with the calibration with mechanical switching. Moreover, weight and costs are reduced, the reliability of the apparatus is increased and a larger number of measurements is possible with only one battery charge.

According to FIG. 1, a laser diode which emits a beam in the forward direction is used for the transmitter 1. Instead, it is also possible to use commercially available laser diodes which emit their beam simultaneously in two opposite directions. The beam directed forwards can be used as a measuring beam and the beam directed backwards as a reference beam. The reference beam can be pointed directly at the reference receiver 3. In this case, the reference beam therefore need not be decoupled from the measuring beam, and the beam divider 11 and possibly also the deflecting mirror 12 are superfluous.

Also available are laser diodes in which a receiving diode which can receive the backward-emitted laser beam is additionally integrated. This receiving diode usually serves for regulating the laser light power. For the purpose according to the invention, it can however also be the reference receiver 3. Thus, beam generation and detection of the reference beam are realized in a single electronic module. In this space saving and economical variant, however, the power limits of the integrated receiving diode must be taken into account.

Figure 2A:
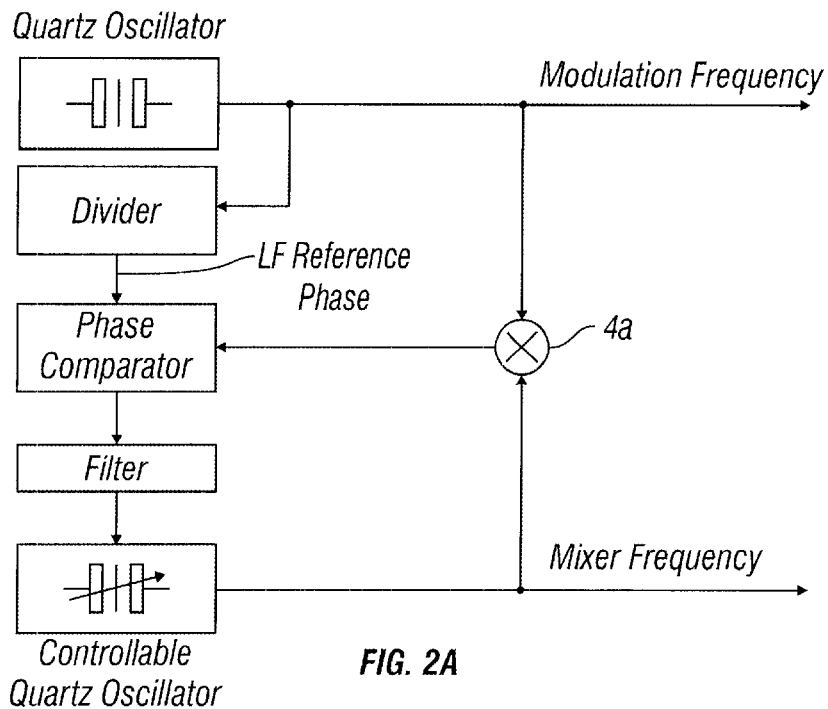
FIG. 2a shows a conventional phase locked loop (PLL) circuit.

A further circuit variant relates to the frequency mixer 4. Usually, the modulation frequency required for the transmitter 1 and the mixer frequency required for the measuring receiver 2 and for the frequency mixer 4 are generated with the aid of a phase locked loop (PLL) circuit, as shown schematically in FIG. 2a. For this purpose, the high-frequency signals of a fixed quartz oscillator and of a controllable, variable-frequency quartz oscillator are fed to a frequency mixer 4a. The low-frequency signal produced in the frequency mixer 4a is compared with the low-frequency reference phase in the phase comparator. accordingly, the frequency of the controllable quartz oscillator is regulated in a phase-stable manner relative to the low-frequency reference phase.

Figure 2B:
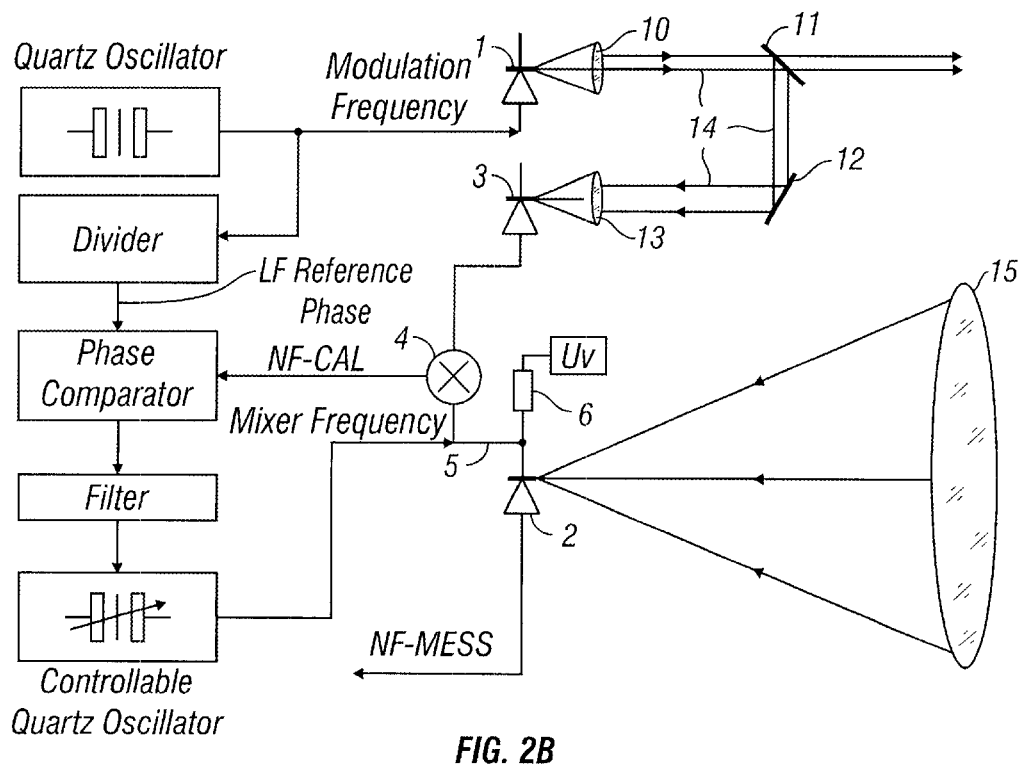
FIG. 2b shows an integration of PLL circuit and subject of the invention.

The function of the frequency mixer 4a of the PLL circuit can however also be performed simultaneously with frequency mixer 4. FIG. 2b shows how the frequency mixer 4 can also be used for the PLL circuit. In such a case, the PLL circuit automatically always regulates the difference between the phase of the modulation frequency and the phase of the mixer frequency to a constant value relative to the low frequency reference phase of the PLL circuit. If this constant value is determined once by a calibration during manufacture of the apparatus and is saved in the apparatus, a single phase measurement per distance measurement is sufficient. In general, only a single frequency mixer and phase meter are required in the apparatus, resulting in cost benefits.

For a further embodiment, it is also possible to use an additional LED, with the aid of which the measuring receiver 2 is illuminated with a known light intensity at the beginning of each distance measurement. The operating point of the measuring receiver 2 can thus be set, i.e. the bias voltage $U_v$, of the avalanche photodiode serving as measuring receiver 2 is adjusted. For this purpose, the additional LED is modulated at low frequency with the means already present in the distance-measuring apparatus and according to the invention, in order to be independent of the background light level, the modulated light emission is measured by the measuring receiver 2 and the bias voltage $U_v$ is thus adjusted. This process takes place within a few milliseconds, with the result that the total measuring time is only insignificantly affected. Advantageously, this initial adjustment of the bias voltage $U_v$ to its operating point makes an additional contribution to improving the accuracy of measurement in every distance measurement. Moreover, even the otherwise basic determination of the specific temperature coefficient of each avalanche photodiode can be dispensed with.

Figure 3:
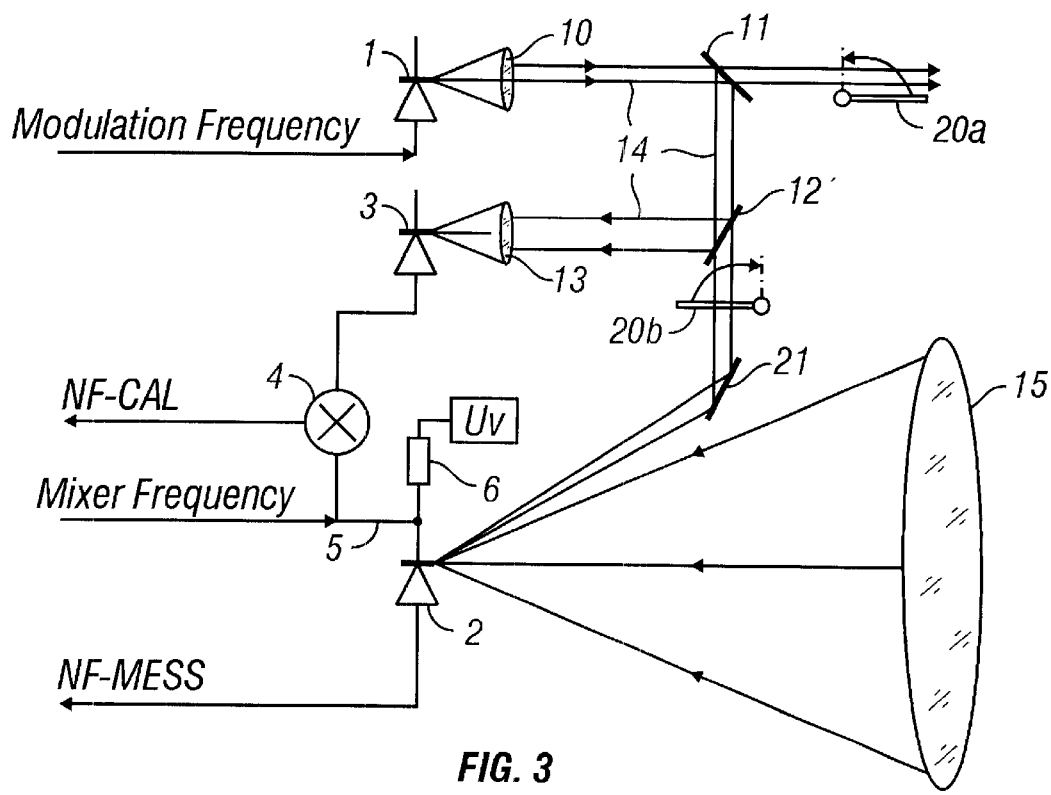
FIG. 3 shows a combination of the subject of the invention with a conventional mechanical switching means.

Finally, the subject of the invention can also be combined with and connected to a distance-measuring apparatus known from the prior art. FIG. 3 schematically shows such a combination of the optoelectronic calibration according to the invention with a conventional calibration with beam switching. The measuring beam can be sent with the aid of the beam switching device 20a,b via a beam divider 12' and a mirror 21 directly to the measuring receiver 2. The beam switching device 20a,b may have the mechanical design shown in FIG. 3. An electro-optical version is of course also possible, for example with the aid of Kerr cells. Thus, a calibration signal and measuring signal are generated alternately with the aid of the beam switching device 20a,b, both signals benefiting from the described advantages of the connection 5, and at the same time the optoelectronic calibration signal of the reference receiver 3 is also present. In general, the accuracy of measurement is further increased by this dual calibration and surpasses the accuracies of measurement of the measuring apparatuses with the single calibration method. For the combination and connection of the two calibration methods, it is however then necessary to accept long measuring times and a more complicated measuring instrument.

I claim:

1. A device for calibrating distance-measuring apparatuses, having a transmitter which emits a high-frequency modulated optical beam and illuminates an object to be measured, a measuring receiver which detects a beam reflected by the object to be measured, and a reference receiver, distance measurement taking place according to a phase measurement principle, wherein
   a) an internal reference distance serves as a calibration distance, over which a part of the beam emitted by the transmitter is guided to the reference receiver so that beams detected in the reference receiver and in the measuring receiver can be evaluated simultaneously, and
   b) an electrical connecting line is provided between a frequency mixer receiving electrical signals of the reference receiver and an avalanche photodiode serving as the measuring receiver, a high mixer frequency being fed into the electrical connecting line so that the high mixer frequency is superposed on a bias voltage of the avalanche photodiode and at the same time is fed to the frequency mixer, with the result that a low-frequency calibration signal is generated in the frequency mixer and a low-frequency measuring signal in the avalanche photodiode, whose mutual phase position is determined for a distance determination.

2. A device for calibrating distance-measuring apparatuses, having a transmitter which emits a high-frequency modulated optical beam and illuminates an object to be measured, a measuring receiver which detects a beam reflected by the object to be measured, and a first avalanche diode operated as a direct mixer which is used as a reference receiver, distance measurement taking place according to a phase measurement principle, wherein:
   a) an internal reference distance serves as a calibration distance, over which a part of the beam emitted by the transmitter is guided to the reference receiver so that beams detected in the reference receiver and in the measuring receiver can be evaluated simultaneously, and
   b) an electrical connecting line is provided between the reference receiver and a second avalanche photodiode serving as the measuring receiver, a high mixer frequency being fed into the electrical connecting line so that the high mixer frequency is superposed on a bias voltage of the second avalanche photodiode and at the same time is fed to the reference receiver with the result that a low-frequency calibration signal is generated in the reference receiver and a low-frequency measuring signal in the second avalanche photodiode, whose mutual phase position is determined for a distance determination.

3. A device according to claim 2, wherein the measuring receiver is separate from the reference receiver and wherein at least a part of the beam emitted from the transmitter is always guided to the reference receiver via the internal reference distance.

4. A device according to claim 1, wherein a PIN photodiode is used as the reference receiver.

5. A device according to claim 1, wherein the reference receiver is integrated in the transmitter.

6. A device according to claim 1, wherein the frequency mixer is simultaneously provided as a mixer for generating the mixer frequency and a modulation frequency of the transmitter.

7. A device according to claim 1, wherein an operating point of the measuring receiver is determined by providing a separate, low-frequency modulated LED which illuminates the measuring receiver with a known light intensity for a very short time at the beginning of each distance measurement.

8. A device according to claim 1, wherein a plurality of beam switching devices are provided and can be set so that the beam of the transmitter passes directly to the measuring receiver instead of to the object to be measured.

9. A device according to claim 1, wherein the measuring receiver is separate from the reference receiver and wherein at least a part of the beam emitted from the transmitter is always guided to the reference receiver via the internal reference distance.

10. A device for calibrating distance-measuring apparatuses which measure distance using a phase measurement principle, the device comprising:
    a transmitter which emits a high-frequency modulated optical beam for illuminating an object to be measured;
    a measuring receiver which detects a beam reflected by the object to be measured;
    a frequency mixer producing a low-frequency calibration signal; and
    an electrical connecting line between the frequency mixer and an avalanche photodiode serving as the measuring receiver, wherein a high mixer frequency is fed into the electrical connecting line so that the high mixer frequency is superposed on a bias voltage of the avalanche photodiode and at the same time is fed to the frequency mixer, with the result that the low-frequency calibration signal is generated in the frequency mixer and a low-frequency measuring signal is generated in the avalanche photodiode, and both low-frequency signals contain phase shifts generated by the avalanche diode thereby allowing compensation for these phase shifts.

11. A device according to claim 10, further comprising:
    a reference receiver which receives a reference beam which is divided from the optical beam emitted from the transmitter, wherein an internal reference distance serves as a calibration distance over which the reference beam is guided to the reference receiver, so that the reference beam detected in the reference receiver and the beam detected in the measuring receiver are evaluated simultaneously thereby allowing compensation for drift in the transmitter, and wherein the frequency mixer receives electrical signals from the reference receiver.

12. A device according to claim 11, further comprising:
    an optical collimator which collimates the optical beam emitted by the transmitter;
    a beam divider which divides the optical beam collimated by the optical collimator to produce the reference beam;
    a lens system which directs the reference beam into the reference receiver; and
    a phase-locked loop which phase-locks a modulation frequency supplied to the transmitter and the high mixer frequency.

13. A device according to claim 10, wherein the measuring receiver is separate from the reference receiver and wherein at least a part of the beam emitted from the transmitter is always guided to the reference receiver via the internal reference distance.

14. A method of calibrating distance-measuring apparatuses which measure distance using a phase measurement principle, the method comprising:

transmitting a high-frequency modulated optical beam using a transmitter;

illuminating an object to be measured with the transmitted optical beam;

detecting a beam reflected by the object to be measured using a measuring receiver;

producing a low-frequency calibration signal using a frequency mixer;

connecting the frequency mixer to an avalanche photodiode, which serves as the measuring receiver, with an electrical connecting line; and supplying a high mixer frequency to the electrical connecting line so that the high mixer frequency is superposed on a bias voltage of the avalanche photodiode and at the same time is fed to the frequency mixer, with the result that the low-frequency calibration signal is generated in the frequency mixer and a low-frequency measuring signal is generated in the avalanche photodiode, and both low-frequency signals contain phase shifts generated by the avalanche diode thereby allowing compensation for these phase shifts.

15. A method according to claim 14, further comprising: compensating for the phase shifts generated by the avalanche diode and measuring a distance to the object to be measured.

16. A method according to claim 14, further comprising:

dividing a reference beam from the optical beam which is transmitted from the transmitter;

receiving, with a reference receiver, the reference beam; and guiding the reference beam over an internal reference distance, which serves as a calibration distance, to the reference receiver, so that the reference beam detected in the reference receiver and the beam detected in the measuring receiver can be evaluated simultaneously and drift in the transmitter can be compensated for in measuring a distance to the object to be measured.

17. A device according to claim 14, wherein the measuring receiver is separate from the reference receiver and wherein at least a part of the beam emitted from the transmitter is always guided to the reference receiver via the internal reference distance.

18. A method of calibrating distance-measuring apparatuses which measure distance using a phase measurement principle, the method comprising:

transmitting a high-frequency modulated optical beam using a transmitter;

illuminating an object to be measured with the transmitted optical beam;

detecting a beam reflected by the object to be measured using a measuring receiver;

dividing a reference beam from the optical beam which is transmitted from the transmitter;

receiving, with a reference receiver, the reference beam; and guiding the reference beam over an internal reference distance, which serves as a calibration distance, to the reference receiver, so that the reference beam detected in the reference receiver and the beam detected in the measuring receiver can be evaluated simultaneously and compensated for drift in the transmitter.

19. A method according to claim 18, further comprising:

evaluating simultaneously the guided reference beam and the beam detected in the measuring receiver; and compensating for drift in the transmitter and measuring a distance to the object to be measured.

20. A device according to claim 18, wherein the measuring receiver is separate from the reference receiver and wherein at least a part of the beam emitted from the transmitter is always guided to the reference receiver via the internal reference distance.

21. A device for calibrating distance-measuring apparatuses which measure distance using a phase measurement principle, the device comprising:

a transmitter which emits a high-frequency modulated optical beam for illuminating an object to be measured;

a measuring receiver which detects a beam reflected by the object to be measured;

a reference receiver which receives a reference beam which is divided from the optical beam emitted from the transmitter, wherein an internal reference distance serves as a calibration distance over which the reference beam is guided to the reference receiver, so that the reference beam detected in the reference receiver and the beam detected in the measuring receiver are evaluated simultaneously thereby allowing compensation for drift in the transmitter; and a frequency mixer receiving electrical signals of the reference receiver.

* * * * *

UNITED STATES PATENT AND TRADEMARK OFFICE
CERTIFICATE OF CORRECTION

PATENT NO.      : 6,463,393 B1
DATED           : October 8, 2002
INVENTOR(S)     : Kurt Giger It is certified that error appears in the above-identified patent and that said Letters Patent is hereby corrected as shown below:

Title page,
Please insert: -- [30] Foreign Application Priority Data,
German 196 43 287 October 21, 1996 --.

Signed and Sealed this

Eighth Day of July, 2003

JAMES E. ROGAN
*Director of the United States Patent and Trademark Office*